United States Patent
Brejner

[11] 3,829,012
[45] Aug. 13, 1974

[54] PRESSURE MAINTAINING FOR A LIQUID HEATING PLANT

[76] Inventor: Gunnar Brejner, Ryney 16, DK 2830, Virum, Denmark

[22] Filed: Sept. 14, 1972

[21] Appl. No.: 289,102

[30] Foreign Application Priority Data
Sept. 17, 1973 Denmark .......................... 4562/73

[52] U.S. Cl. .................... 237/8 R, 137/209, 237/65
[51] Int. Cl. ............................................. F24c 3/06
[58] Field of Search ............... 237/65, 66, 8 B, 8 R; 137/209 X

[56] References Cited
UNITED STATES PATENTS
3,164,162   1/1965   Saunders .............................. 237/66
3,202,356   8/1965   Gardner et al ...................... 237/65 X Primary Examiner—William E. Wayner
Attorney, Agent, or Firm—Watson, Cole Grindle & Watson

[57] ABSTRACT

A central heating plant of the closed system type contains a pressure expansion tank connected to a source of pressurized nitrogen and a steam generator, automatics is provided which, by falling water level in the expansion tank, primarily feeds steam of the same pressure as the pressure prevailing in the tank and secondarily feeds nitrogen to the tank, in order to maintain the working pressure of the plant.

7 Claims, 4 Drawing Figures

PATENTED AUG 13 1974　　　　　　　　3,829,012
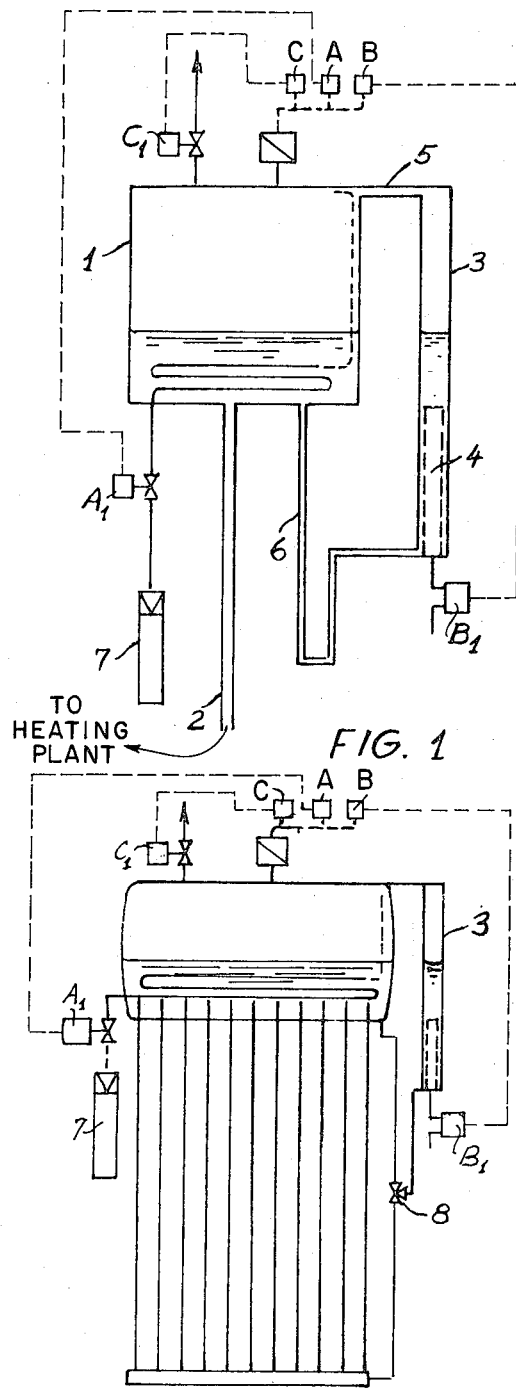
FIG. 1
FIG. 2
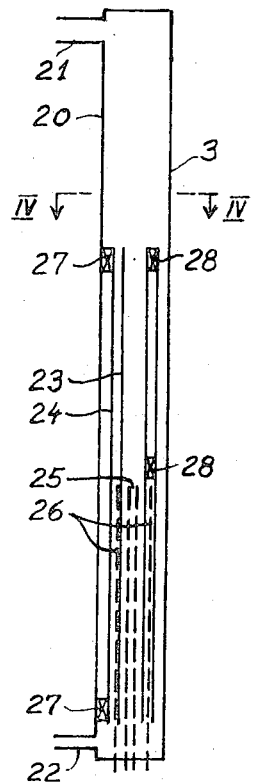
FIG. 3
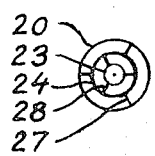
FIG. 4

PRESSURE MAINTAINING FOR A LIQUID HEATING PLANT

BACKGROUND OF THE INVENTION

The present invention relates to a method of maintaining the pressure in a heating plant of the kind capable of working with a liquid at a temperature higher than the boiling temperature of the liquid at atmospheric pressure, wherein the plant comprises a control space for accomodating the volume variations to which the working liquid of the plant is subjected during working and a source of pressurized gas connected to the control space for maintaining a pressure therein, which is higher than the boiling pressure of the working liquid at the prevailing working temperature.

Methods of the kind referred to above are known according to which pressurized gas, in case the pressure in the control space decreases below a predetermined minimum value, is fed to the control space in order to reestablish the pressure and in case the pressure increases above a predetermined maximum value, the control space is vented until the pressure prescribed is reestablished. Non-corrosive gas, e.g., nitrogen, may be used. However, due to the fact that considerable volume changes may occur in the control space above the liquid content thereof, a high amount of such non-corrosive gas is used and accordingly such method is expensive. However, air may be used as the gas in question, but in such case the risk of corrosion in the plant increases, especially if a low temperature prevails in the control space. In the latter instance air may be dissolved in the cool liquid contained in the control space and such air may be liberated in other parts of the plant, when the liquid in question is transferred to the circulation system of the plant from the control space, when the volume of the working liquid of the plant decreases. Moreover, air may be transferred to the other parts of the plant by diffusion through the liquid.

SUMMARY OF THE INVENTION

According to the present invention a method is proposed in accordance with which vapour produced from the same liquid as the working liquid, at decreasing pressure in the control space below a predetermined minimum pressure, is fed into the control space at a temperature equal to or higher than the boiling temperature of the working liquid at the pressure prevailing in the control space, and at said pressure.

By such method a cheap pressure controlling is achieved, seeing that it has been proved that such adding of vapour to the control space, even though the vapour has the same pressure as the pressure prevailing in the control space, is sufficient for compensating for an initial decrease of the pressure in the control space and only if such adding of vapour is insufficient for compensating for the decreasing pressure, pressurized gas is added from the source of pressurized gas. Accordingly, the consumption of gas is reduced, compared to the known method using pressurized gas only. If a gas is used which is non-corrosive to the working part of the plant, which is expensive compared to air, the economy is considerably increased. Moreover, if the gas used is atmospheric air, also a reduced consumption of air is achieved, which results in a reduced risk of corrosion in the plant. In both instances these results are due to the fact that the amount of gas fed to the control space is reduced considerably over the amounts of gas necessary, if a vapour supply as proposed according to the present invention is not used.

Due to the fact that the supply of vapour proposed according to the present invention results in that the temperature of the liquid contained in the control space is maintained as the highest temperature in the plant, the risk of dissolving gas into the liquid contained in the control space will be very limited, and accordingly the risk of having gas liberated in other, cooler parts or parts positioned at a greater height, and accordingly at a lower pressure, is considerably reduced or completely eliminated. The maintaining of the high temperature in the liquid content of the control space may be further stabilized by connecting the control space to the hot liquid supply-pipe of the heating plant and establishing an appropriate circulation. The high temperature in the control space is first of all due to the vapour supply, which will apply heat to the mixture of gas and vapour enclosed in the control space, and which need not be extended to the complete amount of liquid contained in the control space, but may be concentrated to the uppermost layer of liquid in the control space. Moreover, the high temperature of the liquid content of the control space may, as indicated, be supplemented by connecting the control space to the hot liquid supply-pipe of the plant. Moreover, in case the liquid level in the control space rises, such rising may not immediately result in an increasing pressure in the space. This result is also due to the reduced supply of gas into the space, compared with the known methods for controlling such plants. The latter result is due to the fact that an initial rise in the pressure in the control space will result in condensation of a portion of the considerable amount of vapour present in the control space, in such a way that the rising pressure partly will be taken up by such condensation. At the same time the temperature of the liquid in the control space will, under such circumstances, usually decrease a little, due to the fact that the fluid supplied to the control space and which results in the rising liquid level will be a little colder than the liquid present in the control space, in such a way that the partial pressure of the vapour will be less than it was before the rise in the liquid level, corresponding to the slightly cooled liquid in the control space. However, if the liquid level rises to such a degree in the control space that the vapour condensation explained above will be insufficient, a portion of the mixture of vapour and gas is vented from the control space and into the atmosphere, in order to reduce the rising pressure. However, due to the fact that a considerable part of the mixture which is vented is vapour, a minor amount of gas only is vented, viz. corresponding to the consumption of gas.

It should be mentioned that it is known to maintain the pressure in a control space of the kind here in question by means of vapour only, but due to the fact that such known vapour control was not supplemented with the partial pressure of the gas as proposed according to the present invention, great amounts of vapour must be used and accordingly a separate vapour generating plant must be used. Accordingly, the latter method of controlling is usually used only in plants wherein vapour production is requested for other purposes in such a way that a vapour generator is available. Moreover, vapour used alone is not appropriate as controlling medium due to the high sensibility of a pure vapour in the control space to small variations of the temperature of the liquid in the control space, which is due to the fact that the heat exchange, and also the exchange of material, in the interface between liquid and pure vapour is great when the liquid surface in question is boiling. On the contrary, when a mixture of gas and vapour is used the heat and material exchanges are very small due to the fact that no boiling under such conditions occurs at the interface mentioned above.

From the above explanations and further explanations given below it will be understood that the essential feature of the present invention is the use of the advantageous effects of the mixture of gas and vapour which has been realized according to the present invention and which has not been used previously and which results in that the superior effects of the two components of the mixture are used, whereas the inferior effects are considerably reduced.

An improved heat economy is achieved if the vapour supplied to the control space according to the present invention is produced from working liquid which is withdrawn from the control space, which is due to the fact that the liquid in the control space has the high temperature explained above so that the heat necessary in order to produce the vapour is reduced to a minimum.

By changing plants which use vapour as the working medium into plants of the kind here in question, the boiler with steam space which formed the heating source of the original plant is usually re-used. In connection with such rebuilt plants the present invention may also advantageously be used. In such cases the boiler in question is used as the control space according to the present invention so that the pressure is controlled as proposed according to the present invention by feeding vapour and gas into the space previously used as the vapour space of the boiler. Moreover, in such plants it is known to use boilers each having an overhead vapour drum or more boilers having a common overhead vapour drum. If such a plant is to be rebuilt in order to change it into a heating plant using a liquid working medium, the vapour and gas supplies proposed according to the present invention may advantageously be fed to the overhead drum or drums, seeing that such drum or drums already are present in the plant.

The present invention also relates to a heating plant for carrying out the method and of the kind capable of working with a liquid at a temperature higher than the boiling temperature of the liquid at atmospheric pressure, wherein the plant comprises a control space for accomodating the volume variations to which the working liquid of the plant are subjected during working and a source of pressurized gas connected to the control space for maintaining a pressure therein which is higher than the boiling pressure of the working liquid at the prevailing working temperature. According to the present invention such plant is provided with a vapour generating unit which is connected to the control space and which may be supplied with working liquid.

According to an embodiment of the plant according to the invention the vapour generating unit is a heatable container arranged at the same height as the control space in such a way that a liquid level will be established in the heatable container, when not heated, generally at the same height as the liquid level in the control space, that the heating surface of the heatable container is arranged inside a tube open at both ends, the upper end of which is positioned at the same height as or above the highest liquid level in the control space and the lower end of which extends below the lowermost liquid level in the control space, said heatable container moreover being connected to the control space above the upper end of the tube. By means of this embodiment of the invention it is achieved that only vapour will be supplied to the control space by heating the heatable container, seeing that the liquid which otherwise could be carried over into the control space by means of the vapour has the possibility to by-pass the tube. According to the present invention further tubes may be arranged between the tube referred to above and the container. Such further tubes are subjected to the same level conditions as the tube referred to above and portions of the heating surface may be arranged between the tubes. By means of such embodiment the vapour supply to the control space may be controlled stepwise.

BRIEF DESCRIPTION OF THE DRAWING

FIG. 1 shows a part of an embodiment of the plant according to the present invention having a separate control space, FIG. 2 a part of another embodiment of the plant according to the invention wherein the control space is constituted by an overhead drum of a boiler, FIG. 3 a section through an embodiment of an heatable container having electric heating surface for the plant, and FIG. 4 a section along section line IV—IV in FIG. 3.

DESCRIPTION OF THE PREFERRED EMBODIMENT

On the drawing, 1 is a chamber presenting a control space for a heating plant capable of working with a liquid at a temperature which is higher than the boiling temperature of the liquid at atmospheric pressure. The control space 1 moreover serves to accomodate volume variations to which the working liquid of the plant may be subjected during working and is accordingly a pressure expansion space.

In such pressure expansion spaces a pressure is to be maintained which is higher than the boiling pressure of the working liquid at the working temperature in question. Otherwise, boiling will occur in the plant outside the heating source and then the plant will no longer be of the kind here concerned.

The container 1 is connected to the supply pipe (not shown) of the heating plant by means of a pipe 2. Moreover, the expansion container is provided with a heatable container or evaporates 3 containing a heating surface 4. The heatable container 3 is connected in fluid communication with the control space in the expansion container 1 by means of pipes 5 and 6, one of which extends to the top of the expansion container 1 and the other of which extends to the bottom of the container 1 from the top and the bottom, respectively, of the heatable container 3. The lower pipe 6 is provided with a U-tube in order to act as a heat trap.

The expansion container is provided with automatic controls comprising three pressure feelers A, B and C which are connected to the control space for feeling the pressure therein. The feeler A controls a valve A1 for supplying a pressurized gas, in the present instance an inactive gas, from a source 7 to the container 1. The pressure feeler B controls a regulator B1 for switching the heating surface 4 and the pressure feeler C serves to control a valve C1 for venting the mixture of inactive gas and vapour from the space above the liquid in the expansion container 1.

When the pressure in the container 1 decreases to below a predetermined minimum pressure the heating surface 4 is switched on via feeler B and regulator B1 to commence heating and the liquid content in the heatable container 3 is heated to the boiling temperature of the liquid which corresponds to the pressure prevailing in the expansion container 1 which pressure also prevails in the heatable container 3. By further heating, the liquid in the container 3 boils, and the vapour produced is transferred through the pipe 5 to the expansion container 1 so as to increase the vapour content in the mixture of gas and vapour in the expansion container. A part of the vapour feed to the container 1 will be condensed due to the lower temperature in the container 1. However, such condensation in the container 1 will liberate heat of evaporation corresponding to the condensation. The rest of the vapour remains in vapour form in the container 1 and adds to the content of vapour in the mixture of gas and vapour above the liquid in the expansion container 1. The coorporation of these phenomena results in a heating of the mixture in the expansion container 1, above the surface of the liquid therein, and in a heating of the uppermost layer of the liquid and, accordingly, the pressure will increase. When the pressure has been reestablished, the heating surface 4 is switched off via the feeler B and the regulator B1.

If the vapour supply explained above is insufficient for maintaining the predetermined minimum pressure, supplemantal pressurized gas is added from the source 7, viz. if the pressure should decrease to such an extent that the feeler A reacts to open control valve A1. When this is the case supplemental pressurized gas is supplied to the container 1 via the control valve A1 which is connected in fluid communication with the control space in the pipe from the source 7. The pipe discharges into the container 1 in such a way that the gas supplied is heated during the supply thereof. A cold gas would, by being introduced into the hot mixture above the liquid in the container 1, reduce the temperature of the mixture and accordingly the pressure thereof would drop opposite the intentions.

At increasing pressure in the expansion container 1, a portion of the vapour content of the mixture will condense at the first moment as previously explained. However, when such condensation can no longer compensate for the increasing pressure whereby the pressure in the control space increases to above a predetermined maximum pressure, venting of a portion of the mixture from the container 1 will take place by activation of the feeler C, which will open the corresponding venting valve C1 which is connected in fluid communication with the control space.

Due to the vapour supplied to the expansion container 1 from the heatable container 3, the temperature in the expansion container 1 normally will be maintained a few degrees higher than the supply temperature of the heating plant, especially if a connection is established as indicated above between the expansion container 1 and the supply-pipe of the plant. At such temperatures, the content of vapour in the expansion container 1 will be of real importance. If steam is used as the vapour and nitrogen is used as the gas and the pressure in the expansion container amounts to e.g., 11 atm abs. and the temperature in the expansion container amounts to 170°C, the partial pressure of the steam will be a little more than 8 atm abs., and the partial pressure of the nitrogen will be a little less than 3 atm abs. which corresponds to a steam contant of approximately 2 kg steam per kg dry nitrogen. The costs for producing 1 kg steam (directly from the container water as indicated in FIG. 1) amounts to approximately 2 percent of the costs of 1 kg nitrogen, even if the steam is produced in the most expensible way, viz. by electricity. Accordingly, the mixture of nitrogen and steam mentioned above costs one third only of the price of pure nitrogen.

By the embodiment explained above, water is heated in the heatable container 3 by the switching on the heating surface 4 to the boiling temperature of the water which corresponds to the pressure in the container 1, viz. 183°C corresponding to 11 atm abs. and is evaporated at this pressure.

The advantages achieved by means of the present invention, moreover, will be of considerable use in a plant, comprising boilers provided with overhead drums or boilers which are correspondingly used, inclusive boiler plants, comprising more boilers, having a common overhead drum, i.e., any boiler plant, wherein a vapour buffer is used above the water level in the boilers, and wherein liquid is circulated out into the plant from the water contents of the boilers below their water levels.

According to the common practice of today, such boilers are generally used in two different ways in plants of the kind here in question. If the amount of heat requested by the plant is comparatively low, a single boiler with an overhead vapour drum or more boilers having a common overhead vapour drum may be used. In such cases the boiler or the boilers may be connected directly to the heat distributing part of the plant. However, if the heat capacity requested or if the amount of working liquid to be used in the plant or the requirements to secure working are very high, more boilers each having its own overhead vapour drum are necessary. In the latter case, each boiler is normally provided with a heat exchanger, and the secondary sides of the heat exchangers are connected to the heat distributing part of the plant. The violent liquid level changes which will occur if several boilers each having a vapour space are connected directly in parallel with the heat distributing part of the plant, are due to the great heat and material exchanges at the boiling liquid surfaces in such overhead drums, combined with the fact that it is extremely difficult to carry out an identical control of the temperatures at the boiling liquid surfaces in more overhead drums. Within the temperature range 150°–200°C a temperature difference of 1°C will, in the case of water, amount to approximately 0.2 atm or to a difference in water level heights of approximately 2 m, unless the level changes referred to are prevented, either by using a heat exchanger for each boiler or are reduced by using extremely wide and, accordingly, expensive pipes between the boilers or by using special pipe connections, also very wide, between the overhead drums and independent of the circulating pipes.

However, such difficulties are eliminated if the overhead drums of such boilers or the steam spaces corresponding thereto are used as control spaces, according to the method proposed, according to the present invention, and accordingly are provided with heatable containers 3 as schematically illustrated in FIG. 2. In this way, the partial pressure of the gas supplied to the vapour space will cause a drop in the temperature which the liquid surfaces may achieve amounting to several degrees centigrade per atm partial gas pressure.

In this way, the great heat and material exchanges at the liquid surfaces previously referred to, and which occur in the known plants, is reduced to a minor fraction only, in such a way that the temperature variations of the working liquid, which cannot be avoided in practice, only result in a slow change of the partial pressure of the vapour which constitutes a great fraction of the total pressure. This means that the mixture of vapour and gas, within reasonable limits, behaves as an ideal gas and, accordingly, generally follows the common gas equation $PV = RT$, wherein P is the pressure, V is the volume, R is the gas constant, and T is the temperature. Accordingly, boilers provided with overhead vapour drums and other boilers used in the same way can as it will be proved further below be used connected in parallel without difficulties.

If it is assumed that the mixture of vapour and gas in each boiler is disconnected from the mixtures contained in the other boilers during working (even though narrow pipe connections may be advantageous in other connections, e.g., as mutual reserve of capacity between more boilers) pressure variations resulting from variating flow losses at the liquid side and from pressure variations in the mixture of vapour and gas will only result in liquid level variations of such minor importance that they do not result in any problems as regards the working of the plant.

This will be understood from the following considerations which, for the sake of clarification, are mentioned as an example only, wherein only two boilers are used seeing that the effect will be the same for more boilers.

It is assumed that the two boilers are identical and at a certain point of time contain the same volume V of the mixture of vapour and gas under the same pressure P on the liquid surface F. A pressure difference of dP then occurs between the two volumes. The pressure in each volume now becomes $(P + \frac{1}{2}dP)$ and $(P - \frac{1}{2}dP)$ respectively. As mentioned above it can be assumed that the mixtures behave almost as perfect gases and therefore the pressure variations may be calculated from the general gas equation: $P.V = R.T$ and calculated on the basis of this equation the volumes become $V(1 - \frac{1}{2}dP/(P + \frac{1}{2}dP))$ and $V(1 + \frac{1}{2}dP/(P - \frac{1}{2}dP))$ respectively. If it is assumed that the liquid is incompressible, the volumes calculated above must be corrected to the volumes $V(1 - \frac{1}{2}dP/P)$ and $V(1 + \frac{1}{2}dP/P)$ respectively, moreover the volumes of the liquid in the two boilers have changed: $+V \cdot \frac{1}{2}dP/P$ and $-V \cdot \frac{1}{2}dP/P$ respectively. Provided the areas F of the two liquid surfaces do not change considerably by this rise and fall of the water content in the boilers' the liquid level in the first boiler will rise: $V \cdot \frac{1}{2}dP/P \cdot F$, whereas the liquid level in the other boiler falls correspondingly.

If, in continuation of the example previously referred to, the pressure $P = 11$ atm abs. is used and if V e.g., is 4 m³, dP is 0.5 atm (corresponding to a column of hot water, having a height of 5,5 m at a temperature at 170°C) and F is 6 m², the liquid level variation per boiler will be $4 \cdot \frac{1}{2} \cdot 0.5/11 \cdot 6 = 0.0151$, or a little more than 1.5 cm and, accordingly, a little more than 3 cm for both boilers in combination which, compared with the high values of V and F used in the example, is such a small variation that the difference will hardly be observed by the boiler attendant.

Other relevant examples will, correspondingly prove that the method or the plant according to the present invention allows vapour space boilers to be connected in parallel directly with the heat distributing part of the plant which, considerably, simplifies several even great plants.

Moreover, the pressure differences which may occur during working in the individual boiler overhead drums (or boiler vapour spaces) may be used for, via the automatics, to move the reference pressure either manually or automatically for the mixture of vapour and gas in each individual drum or space, in order to carry out a further adaptation of the liquid level in the individual drum (or in the individual space) with respect to the water levels in the other drums or vapour spaces if such further adaptation should be of interest which will hardly be the case as it appears from the above calculations.

Moreover, an extremely simple method is achieved for keeping a boiler hot and under pressure, even if it is not working. This is achieved by simply leaving the automatics for controlling the mixture of vapour and gas for the overhead drum of such boiler untouched, and by providing a liquid connection between the heating container 3 and the bottom of the boiler, as indicated at 8 in FIG. 2.

Moreover, the permanent source for supplying gas to the boiler permits an emptying and cooling-down of the boiler for maintenance or repair quicker than previously. This is due to the fact that the liquid of the boiler, if inactive gas is used, without risk for corrosion can be pressed quickly out of the boiler with the cold gas after disconnecting from the other parts of the plant. Then the gas pressure may be relieved, and a stream of air may be conducted along the liquid side of the boiler whereas the heating surfaces of the boiler, as usually, may be vented by means of cold air using a blower or the chimney draft. Accordingly, maintenance or repair in the interior of the boiler and, accordingly, the reinstatement of the boiler may be carried out more quickly than previously which also may be of importance by calculating the capacity reserve necessary for the complete plant.

As mentioned above, the method and plant according to the present invention may be used in connection with any boiler which is used in the same way as a boiler having an overhead drum or another sort of vapour space, viz. by using the vapour space of such boiler as control space and supply it with vapour and pressurized gas in accordance with the present invention.

FIGS. 3 and 4 illustrate a more detailed embodiment of the heatable container 3 wherein several electric heating elements are used as the heating surface. The container comprises an outer housing 20 at the upper end of which a connection 21 is provided for connecting the housing and the control space in the same way as illustrated in FIG. 1, i.e., above the liquid level in the control space. Moreover, the outer housing is at the lower end thereof provided with a connection 22 for connecting the container and the control space below the liquid level therein. The heatable container is intended to be mounted in level with the control space as illustrated in FIG. 1 in such a way that a liquid level will be achieved in the heatable container, generally, at the same height as the liquid level in the control space, when the heating element is switched off. It will be understood that levelling of the two liquid levels in the control space and in the heatable container depends upon the same principle as communicating vessels. The use of the expression "generally" in this respect is due to the fact that the two levels will not always be at exactly the same height, due to the fact that a temperature difference may occur between the liquid in the control space and the liquid in the heatable container and, accordingly, a small difference may exist between the densities of the liquids.

If the heating surface 4 in the embodiment illustrated in FIG. 1 is switched on a sudden evaporation will occur due to the comparatively small volume of the heatable container in such a way that vapour bubbles may lift liquid from the heatable container and into the control space, viz. when the density of the liquid mixed with vapour bubbles in the container 3 decreases, sufficiently. In order to avoid such transfer of liquid into the control space, a tube arrangement is provided according to the embodiment illustrated in FIGS. 3 and 4, comprising an inner tube 23 and an outer tube 24. Inside the tube 23, electric heating elements 25 are provided, and electric heating elements 26 are also provided in the space between the inner and outer tubes.

Both the tubes 23 and 24 extend with the upper ends thereof up to or above the maximum liquid level in the corresponding control space. Moreover, the tubes extend with their lower ends down below the lowermost liquid level in the control space. Moreover, the height of the outer housing 20 is such that the connection 21 is positioned well above the upper ends of the tubes 23 and 24.

In order to support the two tubes 23 and 24 in the embodiment illustrated, two sets of brackets 27 are welded to the outer surface of the outer tube 24. Each bracket comprises three struts, secuted to the inner surface of the outer housing 20. The inner tube 23 is secured with respect to the outer tube 24 by means of two corresponding sets of brackets 28, each comprising three struts welded to the tubes.

By means of the embodiments illustrated in FIGS. 3 and 4, the vapour-lift action referred to above and which may result, by using the simple embodiment of the heatable container shown in FIGS. 1 and 2, is avoided. In general, a transferring of liquid from the container 3 and into the control space does no harm, but may result in pressure pulses which are avoided by means of the embodiment illustrated in FIGS. 3 and 4. When the inner heating elements 25 are switched on, the liquid column positioned inside the inner tube 23 will be heated suddenly, an when the vapour production starts, the vapour bubbles will have a tendency to carry liquid along, mixed with the vapour bubbles. As soon as the vapour bubbles reach the upper end of the tube 23, such liquid will, due to the gravitational effect, fall back into the space between the inner and outer tubes 23 and 24. Accordingly, the heating effect will be concentrated to a limited amount of liquid and the vapour will develop rapidly. Accordingly, vapour only will be transferred to the control space due to the separating effect explained above. The liquid which will be by-passed to the space between the tubes will add to the heating of the liquid in this space and, accordingly, prepare the switching on of the heating elements 26 in the space between the two tubes. Accordingly, when the heating elements 26 are switched on, the vapour production will start rapidly in the space between the tubes. A vapour-lift effect will also result, but the liquid will be separated at the upper end of the outer tube 24 and flow back into the space between the outer tube 24 and the outer housing 20. In order to compensate for the liquid evaporated, liquid will flow into the inner tube 23 and into the space between the tubes around the lower ends of the tubes from the control space through the connection 22.

It will be understood that the same effect, in a less sophisticated way, may be achieved, by using one tube only. Such more simple solution is intended to be used in connection with smaller plants, wherein the total effect needed by the heating surface, which in this case is arranged inside the tube, is of such small size that the electric wiring permits the switching on thereof in one step, or in connection with plants, wherein the effect of the heating surface may be controlled gradually.

I claim:

1. A method of controlling the working pressure of a heating plant working with a liquid at a temperature higher than the boiling temperature of the liquid at atmospheric pressure, wherein the plant comprises means defining a control space above the level of at least a portion of the working liquid for accommodating the volume variations to which the working liquid of the plant are subjected during working, there being a mixture of vapor and gas maintained in said control space above said level of the working liquid, said method comprising:

feeding into said control space, in response to a decrease of the pressure in said control space below a first predetermined minimum pressure, vapor produced from the same liquid as the working liquid, said vapor having a temperature at least as high as the boiling temperature of the working liquid at the pressure prevailing in said control space and having a pressure substantially the same as said prevailing pressure;

feeding pressurized gas into said control space in response to a decrease of the pressure therein below a second predetermined minimum pressure lower than said first minimum pressure; and venting a portion of said mixture from said control space in response to an increase of the pressure in said control space above a predetermined maximum pressure higher than said first minimum pressure.

2. A heating plant capable of working with a liquid at a temperature higher than the boiling temperature of the liquid at atmospheric pressure, said plant comprising:

a chamber presenting a control space for accomodating volume variations to which the working liquid of the plant is subjected during working;

an evaporator connected in fluid communication with said control space and including heating means for producing from said working liquid, vapor having a temperature at least as high as the boiling temperature of the liquid at the pressure prevailing in said control space and having a pressure substantially the same as said prevailing pressure;

a first pressure feeler for controlling said heating means, said first pressure feeler being connected to the heating means and the control space and being operable to cause the heating means to commence heating in response to a decrease of the pressure in said control space below a first predetermined minimum pressure;

a control valve connected in fluid communication with said control space for introducing pressurized gas from a source thereof into said control space;

a second pressure feeler for controlling said control valve, said second pressure feeler being connected to the control valve and the control space and being operable to open said control valve in response to a decrease of the pressure in said control space below a second predetermined minimum pressure lower than said first predetermined minimum pressure;

a venting valve connected in fluid communication with the control space for venting the latter; and a third pressure feeler for controlling said venting valve, said third pressure feeler being connected to the venting valve and the control space and being operable to open said venting valve in response to an increase of the pressure in said control space above a predetermined maximum pressure higher than said first predetermined minimum pressure.

3. An expansion device for a heating plant of the closed type and comprising an expansion vessel, an evaporator and a source of pressurized gas, said evaporator comprising a container and heating means in the container, the top of said container being connected to the top of said vessel, and the lower portion of said container being connected to the lower portion of said vessel, there being included a first pressure feeler for controlling said heating means, said first pressure feeler being adapted to actuate said heating means in response to a decrease of the pressure in said expansion vessel below a first minimum pressure, said device further comprising a control valve interconnecting said source of pressurized gas and said expansion vessel and a second pressure feeler adapted to open said control valve in response to a decrease of the pressure in said expansion vessel below a second minimum pressure lower than said first minimum pressure, there also being included a venting valve connected to the expansion vessel and a third pressure feeler adapted to open said venting valve in response to an increase of the pressure in said expansion vessel above a predetermined maximum pressure higher than said first minimum pressure.

4. A boiler mechanism for a heating plant capable of working with a liquid at a temperature higher than the boiling temperature of the liquid at atmospheric pressure, said boiler mechanism comprising:

an overhead drum for accomodating volume variations to which the working liquid of the plant is subjected during working;

an evaporator connected to said overhead drum, said evaporator comprising heating means adapted to produce vapor from said working liquid at a temperature at least as high as the boiling temperature of the working liquid at the pressure prevailing in said overhead drum and at a pressure substantially the same as said prevailing pressure;

a first pressure feeler for controlling said heating means, said first pressure feeler being connected to the heating means and to the drum and being operable to actuate said heating means in response to a decrease of the pressure in said overhead drum below a first predetermined minimum pressure;

a control valve for interconnecting said overhead drum and a source of pressurized gas;

a second pressure feeler for controlling said control valve, said second pressure feeler being connected to the control valve and to the drum and being operable to open said control valve in response to a decrease of the pressure in said overhead drum below a second predetermined minimum pressure lower than said first predetermined minimum pressure;

a venting valve for said overhead drum; and a third pressure feeler for controlling said venting valve, said third pressure feeler being connected to the venting valve and to the drum and being operable to open said venting valve in response to an increase of the pressure in the drum above a predetermined maximum pressure higher than said first predetermined minimum pressure.

5. In a heating plant, the working fluid of which is in liquid form heated to a temperature higher than the boiling temperature of the liquid at atmospheric pressure, tank means presenting a pressure control space partly filled with a body of said liquid, said control space being connected into said plant so as to receive liquid therefrom and to deliver liquid thereto in accordance with volume variations in said liquid in said plant, there being included an evaporator connected to said control space by two pipes, one of which pipes extends between the top of said evaporator and said control space above said body of liquid therein and the other of which extends from the bottom of said evaporator and into fluid communication with the working fluid of the plant, said evaporator containing heating means and being arranged at such a height with respect to said control space that the heating means is disposed at a lower height than the level of said body of liquid, first pressure feeler means being included for controlling said heating means, said first pressure feeler being arranged to actuate said heating means in response to a decrease of the pressure in said control space below a first predetermined minimum pressure;

there being included a control valve for connecting said control space to a source of pressurized gas and a second pressure feeler for controlling said control valve, said second pressure feeler being arranged to open said control valve in response to a decrease of the pressure in said control space below a second predetermined minimum pressure lower than that first predetermined minimum pressure;

there being further included a venting valve for interconnecting said control space and the atmosphere and a third pressure feeler for controlling the venting valve, said third pressure feeler being arranged to open said venting valve in response to an increase of the pressure in said control space above a predetermined maximum pressure higher than said first predetermined minimum pressure.

6. A heating plant as set forth in claim 5, wherein said evaporator comprises a hollow tube which is open at both ends, said heating means being disposed inside the tube, said tube being disposed vertically with its upper end disposed at least as high as the level of the surface of the liquid body at said control space and with its lower end extending below the level of said surface of the liquid body in said control space.

7. A plant as set forth in claim 6, wherein said evaporator comprises a second hollow tube disposed within said first mentioned hollow tube, the upper end of said second tube being disposed at least as high as the level of said surface and the lower end of said second tube extending below the level of said surface, at least a portion of said heating means being disposed in the space between the first mentioned tube and said second tube.

* * * * *